(12) United States Patent
Saridakis

(10) Patent No.: US 9,258,362 B2
(45) Date of Patent: *Feb. 9, 2016

(54) SYSTEM AND METHOD FOR ESTABLISHING PEER TO PEER CONNECTIONS BETWEEN PCS AND SMART PHONES USING NETWORKS WITH OBSTACLES

(71) Applicant: Core Wireless Licensing S.A.R.L., Luxembourg (LU)

(72) Inventor: Titos Saridakis, Espoo (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,510

(22) Filed: Sep. 12, 2014

(65) Prior Publication Data
US 2014/0379875 A1 Dec. 25, 2014

Related U.S. Application Data

(63) Continuation of application No. 11/158,710, filed on Jun. 22, 2005, now Pat. No. 8,874,691.

(51) Int. Cl.
G06F 15/16 (2006.01)
H04L 29/08 (2006.01)
H04L 29/06 (2006.01)
H04L 29/12 (2006.01)

(52) U.S. Cl.
CPC .......... *H04L 67/104* (2013.01); *H04L 61/2578* (2013.01); *H04L 63/029* (2013.01); *H04L 67/02* (2013.01); *H04L 67/28* (2013.01)

(58) Field of Classification Search
CPC ..................................................... G06F 15/173
USPC .................................... 709/217, 219; 726/12
See application file for complete search history.

(56) References Cited

U.S. PATENT DOCUMENTS

| 6,789,119 | B1 * | 9/2004 | Zhu et al. | 709/227 |
|---|---|---|---|---|
| 7,028,091 | B1 * | 4/2006 | Tripathi et al. | 709/230 |
| 2003/0210694 | A1 * | 11/2003 | Jayaraman et al. | 370/392 |
| 2006/0075116 | A1 * | 4/2006 | Chitilian et al. | 709/227 |

* cited by examiner

*Primary Examiner* — David Lazaro
*Assistant Examiner* — Marie Georges Henry
(74) *Attorney, Agent, or Firm* — Borden Ladner Gervais LLP

(57) ABSTRACT

A method of circumventing network obstacles to provide a peer-to-peer communication channel between peers utilizing hypertext transfer protocol (HTTP) includes communicating a HTTP request from a peer device to a relay through a network including an obstacle where the HTTP request is intended for another peer device. The method further includes communicating a HTTP response from the relay to the peer device and establishing a communication channel between the peer device and the another peer device via the relay. The communication channel permits the peer device and the another peer device to send and receive data.

19 Claims, 2 Drawing Sheets

SYSTEM AND METHOD FOR ESTABLISHING PEER TO PEER CONNECTIONS BETWEEN PCS AND SMART PHONES USING NETWORKS WITH OBSTACLES

CROSS-REFERENCE TO RELATED APPLICATIONS

This application is a continuation of U.S. patent application Ser. No. 11/158,710, filed on Jun. 22, 2005. U.S. patent application Ser. No. 11/158,710 is incorporated herein by reference.

BACKGROUND OF THE INVENTION

1. Field of the Invention

The present invention relates generally to firewalls and peer to peer connections. More specifically, the present invention relates to a system and method for establishing peer to peer (P2P) connections between PCS and smart phones or other devices, including personal computers, over a network that obstructs the straightforward establishment of such P2P connections using means such as firewalls and network address translation (NAT) servers.

2. Description of the Related Art

This section is intended to provide a background or context. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

The majority of devices on the Internet, whether stationary (e.g., personal computers) or mobile (e.g., smart phones), are connected to the Internet through network connections offered by some Internet Service Provider (ISP) or some Cellular Network Operator (CNO). The traditional model for accessing content over the Internet is centered around Web servers: content is placed by content providers on Web servers operated by service providers (often ISPs and CNOs assume both roles of content and service provider); then, users interested in specific content access the corresponding Web server(s) to obtain it. In this content distribution model, the users who may possess some content cannot offer it directly to other users, unless they place it on some Web server.

An alternative to this content-distribution model centered on Web servers is the peer-to-peer (P2P) model. Here, the user may directly share with other users the content he or she possesses. Each P2P protocol (Napster, Gnutella, Chord, FastTrack, etc) comes with a content location service, centralized or distributed, which permits the location of the peer(s) that contain a specified content. Using such a location service, a user looking for some specific content may connect to the device of another user who offers the content in question and retrieve it from there.

In order for P2P protocols to work over the Internet, the establishment of a connection between two peers at the edges of the Internet (e.g., PCs or smart-phones) must be possible. It is not a trivial task to satisfy this requirement, especially taking into consideration the constraints imposed by firewalls and NAT servers that are used by ISPs and CNOs to protect and control their networks.

Firewalls are used to control the data traffic that goes through them. In practice, the great majority of such firewalls allow only solicited HTTP traffic to reach a smart phone or a PC, while plain IP traffic (over TCP or UDP) is blocked. Even if a smart phone has an HTTP server, an HTTP request sent by a remote device to that server would not go through these firewalls, since the HTTP message is unsolicited by the receiving smart phone. Consequently, for such strict firewall policies, there is no straightforward way to establish a P2P connection between two peers that lie on different side of such a firewall.

NAT servers also create obstacles to a P2P connection, especially for the case where one peer is a smart phone that roams across different CNOs while connected to the Internet. In that case, while the smart phone would be connected to a P2P overlay network, it will change its IP address and consequently it will lose all socket connections that have been established to its previous IP address.

Previous attempts have been made to provide solutions to the problem of establishing P2P connections in an environment including firewalls and NAT servers, both in the fixed and in the mobile Internet cases. In the fixed Internet, a peer (PC) is assigned a possibly different IP address by a NAT server every time it connects to the network. However, as long as the peer remains connected to the network, the IP address is not changed. Hence, the problem of changing IP address while connected to the network does not appear in the fixed Internet and, consequently, existing P2P protocols do not provide solutions for such cases. However, in applications connected to the Internet by way of a mobile device, a smart phone that roams may change its IP address while being connected to the network. As such, P2P protocols from the fixed Internet cannot operate correctly.

In the fixed Internet, corporate networks can include firewalls that implement the strict security policy of allowing only solicited HTTP traffic to reach a PC connected in the corporate network. Similarly, many cellular network operator (CNO) firewalls implement the same strict security policy. A number of solutions to P2P connections despite the presence of CNO firewalls have been proposed in the context of SIP deployment, since SIP traffic faces the same constraints from the firewalls as any other, unsolicited HTTP traffic. These solutions rely on the dynamic allocation of pinholes on the firewalls to allow SIP traffic to go through. Such solutions create another case of specific traffic, similar to the solicited HTTP traffic. They are not a generic solution to the establishment of P2P connections.

There is a need to establish peer to peer (P2P) connections between PCs and smart phones despite the obstacles imposed by firewalls, which allow only solicited HTTP traffic to go though, and by NAT servers, which change the IP address of roaming smart phones. Further, there is a need for a reliable peer-to-peer communication protocol that works in a network environment including a firewall without relying on special firewall features.

SUMMARY OF THE INVENTION

In general, exemplary embodiments described herein establish peer to peer connections between personal computers (PCs) and smart phones despite the obstacles imposed by firewalls, which allow only solicited HTTP traffic to go through, and by network address translation (NAT) servers, which change the IP address of roaming smart phones. Exemplary embodiments utilize an HTTP-based protocol that does message relaying. The purpose of the protocol is to enable a socket connection between two terminals despite firewalls between them. The protocol uses HTTP requests and responses to relay the messages between the peers without expecting any favorable behavior from the firewalls (e.g., opening "pinholes" for specific TCP (transmission control protocol) or UDP (user datagram protocol) traffic).

One exemplary embodiment relates to a method of circumventing network obstacles to provide a peer-to-peer communication channel between peers utilizing hypertext transfer protocol (HTTP). This method can include communicating a HTTP request from a peer device to a relay through a network including an obstacle where the HTTP request contains data intended for another peer device. The method further includes communicating data in a HTTP response from the relay to the peer device and establishing a communication channel between the two peer devices via the relay. The communication channel permits the peer device and the another peer device to send and receive data.

Another exemplary embodiment relates to a system for circumventing network obstacles to provide a peer-to-peer communication channel between peers. The system can include a first peer device communicating with a relay via a network including an obstacle, a second peer device communicating with the same relay via a network including another device, and a server coupled to the first and second peer devices and including programmed instructions to carry out functions of relaying the communication from the first peer device to the second and vise versa. The server receives a HTTP request from the first peer device. This HTTP request includes data intended for another peer device. The server further relays the aforementioned data to the intended peer device establishing thus a virtual communication channel between the first peer device and the second peer device to enable sending and receiving of data.

Another exemplary embodiment relates to a computer program product to circumvent network obstacles and provide a peer-to-peer communication channel between peers utilizing hypertext transfer protocol (HTTP). The computer program product can include computer code that communicates a HTTP request from a peer device to a relay through a network including an obstacle and on to another peer device, computer code that communicates a HTTP response from the relay to the peer device, and computer code that establishes a communication channel between the peer device and the another peer device via the relay. The communication channel permits the peer device and the another peer device to send and receive data.

DETAILED DESCRIPTION OF EXEMPLARY EMBODIMENTS

Figure 1:
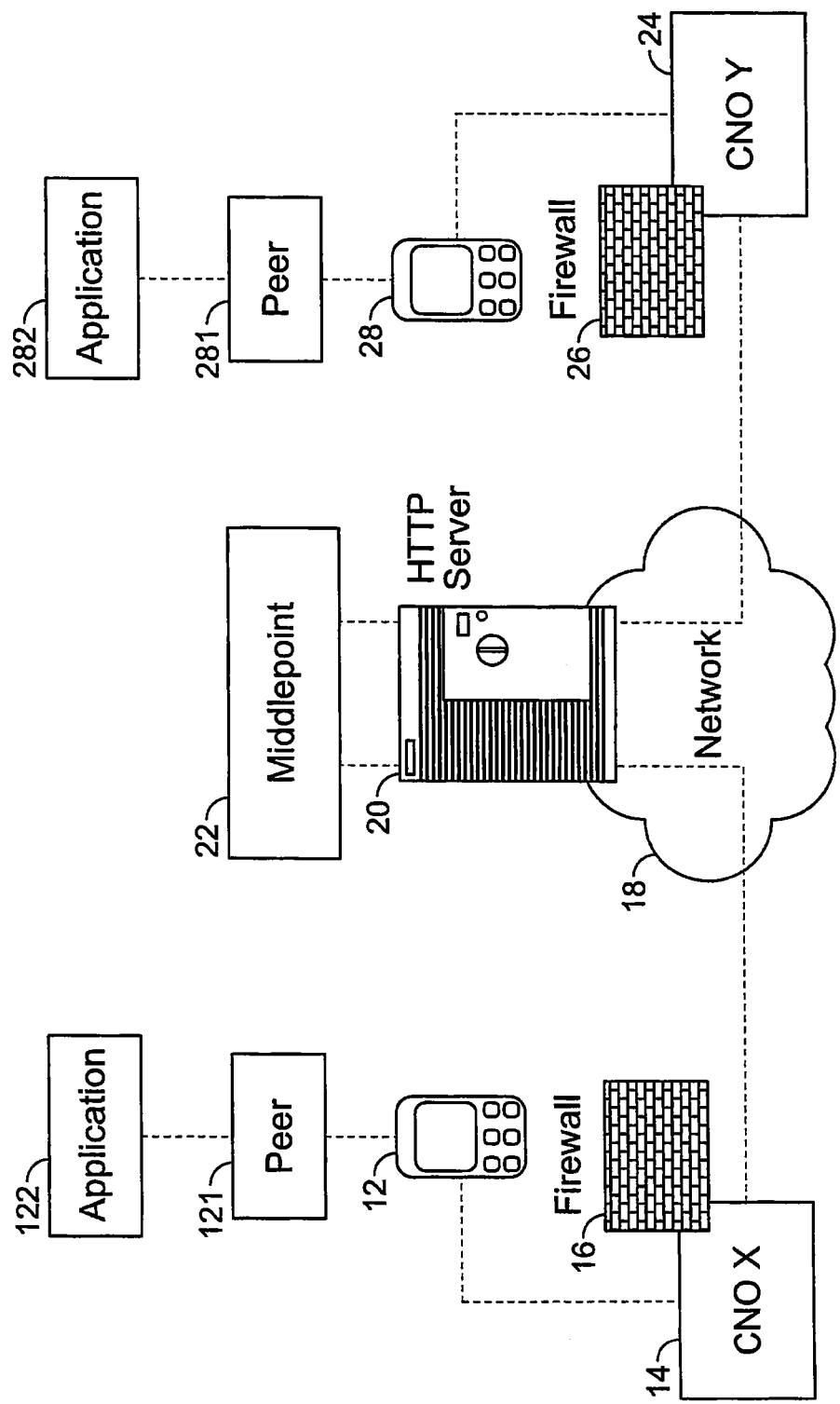
FIG. 1 is a general diagram of a peer-to-peer system in accordance with an exemplary embodiment.

FIG. 1 illustrates a peer-to-peer system 10. In an exemplary embodiment, the peer-to-peer system 10 includes a peer device 12, a cellular network operator (CNO) 14, a firewall 16, a network 18, a server 20, middlepoint software 22, a CNO 24, a firewall 26, and a peer device 28. Additional, fewer, or different devices can also be included in the peer-to-peer system 10 depending on the implementation or embodiment. The peer device 12 and peer device 28 include software identified in FIG. 1 as peer software 121 and peer software 281, such as a midlet that enables an application programming interface (API) for peer-to-peer communication with other peer devices. The network 18 can be the Internet or another similar network of devices. The server 20 is coupled to the network 18 and communicates using HTTP (hypertext transfer protocol) messages. The middlepoint software 22 is resident in the server 20 and provides instructions for facilitating peer-to-peer communication between peer devices. The middlepoint software 22 and server 20 function as a relay in the peer-to-peer communication between peer devices.

Peer-to-peer communication in the peer-to-peer system 10 is carried out using a communication channel established between peers. From the viewpoint of an application 122 on peer device 12 and an application 282 on peer device 28, the communication channel operates as a socket connection. One peer listens for connections, another peer establishes a connection with the first one, and then both sides of the communication channel can send and receive data on that channel. Applications 122 and 282 on peer devices 12 and 28, respectively, can listen for connections, establish a connection, and send/receive data on an established connection. When a peer wants to allow other peers to connect to it and create a communication channel, the peer communicates to the server 20 the fact that this peer is listening for connections and the endpoint where the given peer listens for connections. When a peer attempts to establish a connection with a remote peer, which presumably listens for connections, it must communicate to the server 20 the fact that this peer attempts to establish a connection to a remote peer and the endpoint of the remote peer, to which the given peer attempts to establish a connection.

By way of example, when a connection between an application on peer device 12 and an application peer device 28 is established, each can send data to the other and receive data sent by the other. The data that application 122 intends to send to application 282, travels along the following path: application 122 writes the data on a socket connection provided by peer 121; peer 121 packages the data in an HTTP request and sends it to the middlepoint 22; the middlepoint 22 copies the data in the received HTTP request to and HTTP response which is returned to peer 281; peer 281 receives the HTTP response, extracts the data and buffers them until the application 282 performs a read operation on the socket that peer 281 provides to it. The server 20 does not buffer data. The server 20 keeps information about the established communication channels and forwards data sent by a peer to the intended recipient.

From the moment a peer has established a communication channel with a remote peer, no explicit action needs be taken by the receiving peer in order for sent data to reach it. However, the application running on top of the receiving peer may not be able to consume the received data immediately. For this, the receiving peer buffers receives data until the received data is consumed by its associated application. Since the receiving buffer of a peer is of finite size, it is possible that it overflows (e.g., if the associated application consumes data slower than the corresponding peer receives data). In the occasion of such event, the receiving peer may notify the server 20 about the overflow. If the server 20 receives such a receiving-buffer overflow notification, the server 20 informs the peer that sent the data that caused the overflow about the event.

The choice of whether a receiving peer notifies the server about the overflow of its receiving buffer depends on the properties of the established communication channel. If the communication channel is established as a non-reliable connection (e.g., a UDP datagram connection), then no notification need be sent by the peer that experiences the buffer overflow. If the communication channel is established as a reliable stream (e.g., a TCP session) then notification is produced by the peer that experiences the buffer overflow.

Figure 2:
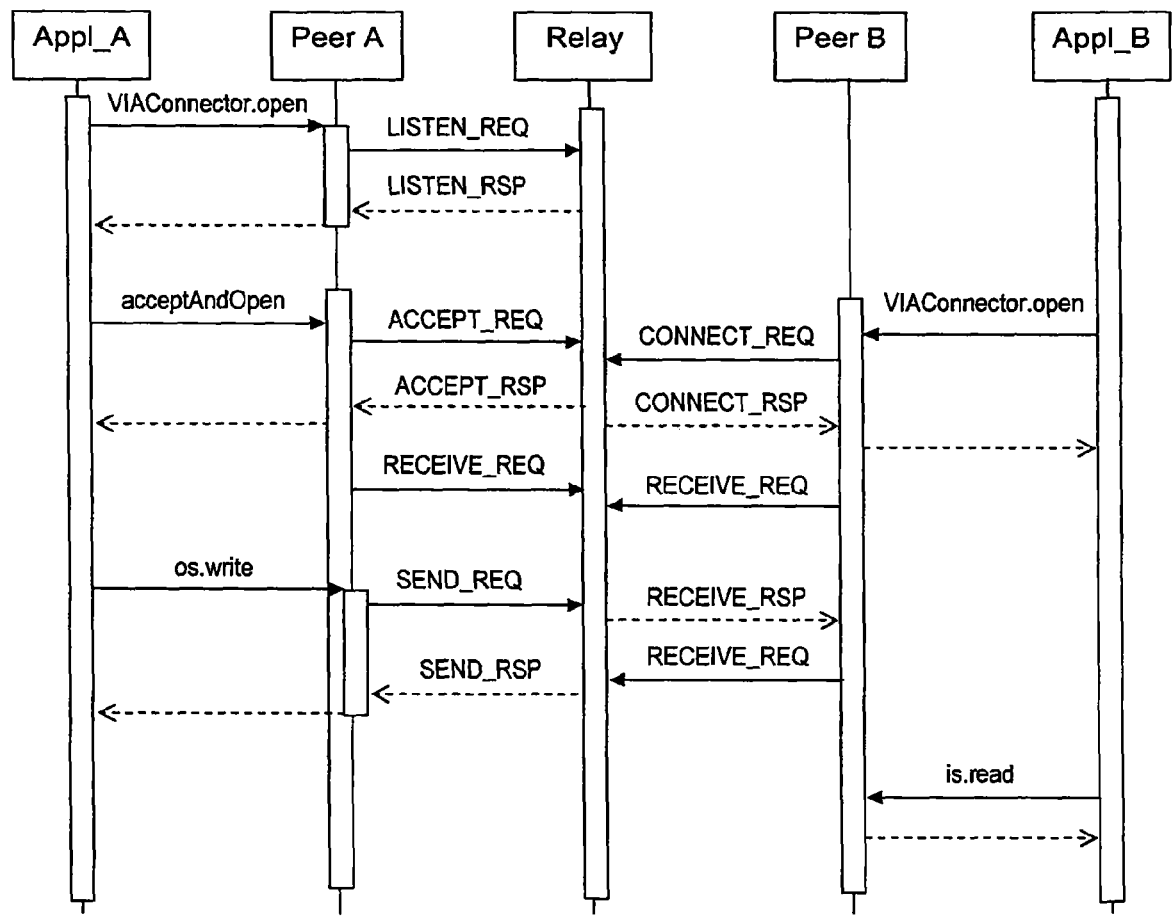
FIG. 2 is a diagram depicting a sequence diagram of interactions between two peers and a relay in the peer-to-peer system of FIG. 1 in accordance with an exemplary embodiment.

FIG. 2 illustrates a sequence diagram of interactions between two peers and a relay in which a communication channel is established and data is exchanged over it. Peer A is listening for connections, peer B establishes a connection to peer A, peer A sends a message and, upon receiving it, peer B sends a message. The interactions between a peer and the relay are defined as synchronous messages, associated with a response.

By way of an illustrative example, a peer that wishes to listen for connections from other peers informs the relay about this intention by sending a LISTEN_REQ message to the relay that indicates the peer's intention to listen for connections. As a response, the relay sends a LISTEN_RSP message to the peer, indicating the success or the reason of failure of the attempted operation.

Once a server-side socket is opened with the exchange of LISTEN_REQ and LISTEN_RSP messages between a peer and the relay, the socket-server accepts connections on it. To indicate to the relay that a given peer is ready to accept connections from remote peers, the given peer sends to the relay an ACCEPT_REQ message. Once a remote peer has requested to establish a connection to the given peer, the relay responds to the ACCEPT_REQ message with an ACCEPT_RSP message.

The client-side of a socket that wants to establish a connection with a well-known server-side endpoint must attempt to connect to it. To achieve such a connection, a peer sends to the relay a CONNECT_REQ message that indicates the peer's intention to connect to a given endpoint. As a response, the relay sends a CONNECT_RSP message to the peer, indicating the success or the reasons of failure of the attempted connection.

Once a connection between two peers is established, each of the peers can send data to the other one and receive data from it. The act of sending data is taken by a peer when it has data to send. The data are sent to the relay, which forwards them to the other end of the established connection without buffering them. As such, the sent data must be delivered to the receiving end of a connection immediately. The act of receiving data is possible at all times at each end of an established connection. The fact that sent data are delivered at the receiving end without buffering at the relay does not mean that the application, which uses sockets for remote communication, must consume the received data immediately. Rather, it is the responsibility of the code at the receiving end to buffer the received data until the application attempts to read them. Then, the application at the receiving end must perform a local operation of retrieving data from its incoming buffer. The local operation blocks if the incoming buffer is empty.

To receive data, a peer sends to the relay a RECEIVE_REQ message, which indicates the readiness of the peer to receive data. When data are sent to that peer, the relay answers the RECEIVE_REQ message with a RECEIVE_RSP message which contains the data sent to the peer in question. On the other hand, when a peer has data to send over an established connection, it sends them to the relay with a SEND_REQ message. Upon reception of such a message, the relay forwards the received data to the intended recipient and sends back a SEND_RSP message to the sending peer.

Following the socket model, at the end of the interaction between peers all established connection are closed. In addition, when a listening peer is not willing to accept connection anymore, it closes the listening connection. To perform these housekeeping actions, the peer sends a CLOSE_REQ message to the relay and receive a CLOSE_RSP as confirmation of the completion of the housekeeping actions.

The techniques described with reference to FIGS. 1 and 2 have several advantages. For example, the approach described does not require any changes in the existing infrastructure, neither does it conflict with current firewall policies. It delivers peer-to-peer connection while using standard HTTP and obeying the strictest firewall policies. Moreover, it is easy to use, allowing the developers to use the technique as an alternative to TCP/IP sockets without having to invest any effort in learning a new protocol. Still further, the approach has small impact on the peers. The only thing a peer needs to have in order to be able to use the protocol is the midlet that implements the API. This API code does not represent a significant amount of code; neither does it represent a significant execution overhead on the peer.

The approach described with reference to FIGS. 1 and 2 provides a robust peer-to-peer communication protocol despite a number of firewalls that may be placed between two peers. The reliability of the approach stems from the fact that it does not attempt to take advantage of holes in the security policies realized by the firewalls. Neither does it rely on special features implemented by few current firewalls or expected to be implemented by future firewalls. Rather, the approach builds on the minimum set of rules that are followed by the majority of the firewalls today, such as allowing solicited HTTP traffic to reach terminals inside the firewall-protected network.

The approach described herein is different than existing peer-to-peer socket implementations, such as the JXTA peer-to-peer sockets (described in the article "Introduction to Peer-to-Peer Sockets," which is available at the web address http://www.codinginparadise.org/p2psockets/1.html). For example, the JXTA P2P socket approach requires the entire JXTA infrastructure to work, whereas the approach of the exemplary embodiments requires only HTTP communications. The JXTA P2P sockets cannot circumvent firewalls that are not part of the JXTA framework. The exemplary embodiments can circumvent any firewall that allows as little as only solicited HTTP traffic.

While several embodiments of the invention have been described, it is to be understood that modifications and changes will occur to those skilled in the art to which the invention pertains. Accordingly, the claims appended to this specification are intended to define the invention precisely.

What is claimed is:

1. A method comprising:
    receiving at a relay server a request from a first peer device via a network including an obstacle, wherein the request from the first peer device comprises data intended for a second peer device;
    receiving at the relay server a request from the second peer device, the request from the second peer device including an indication that the second peer device is listening for connections;
    forwarding by the relay server the data to the second peer device in response to the request received from the second peer device without the relay server buffering the data received from the first peer device intended for the second peer device; and
    generating and transmitting by the relay server a response comprising peer specific signaling to the second peer device in response to the request received from the second peer device.

2. The method of claim 1, wherein at least one of the first peer device and the second peer device comprises software running on a mobile device.

3. The method of claim 1, wherein forwarding includes copying the data from the request from the first peer device intended for the second peer device into a response transmitted from the relay server to the second peer device.

4. The method of claim 1, wherein the request received from the first peer device comprises configuration information.

5. The method of claim 1, wherein at least one of the first peer device and the second peer device comprises a smart phone.

6. The method of claim 1, wherein the obstacle comprises a firewall configured to restrict network traffic between the first peer device and other entities on the network.

7. The method of claim 1, wherein the obstacle comprises a network address translation (NAT) server positioned on the network between the first peer device and the relay server.

8. One or more non-transitory computer-readable media, storing computer-executable instructions, that when executed by a computer, direct the computer to perform a method comprising:
   receiving at a relay server a request from a first peer device via a network including an obstacle, wherein the request from the first peer device comprises data intended for a second peer device;
   receiving at the relay server a request from the second peer device, the request from the second peer device including an indication that the second peer device is listening for connections;
   forwarding by the relay server the data to the second peer device in response to the request received from the second peer device without the relay server buffering the data received from the first peer device intended for the second peer device; and
   generating and transmitting by the relay server a response comprising peer specific signaling to the second peer device in response to the request received from the second peer device.

9. The computer-readable media of claim 8, wherein the obstacle comprises a firewall configured to restrict network traffic between the first peer device and other entities on the network.

10. The computer-readable media of claim 8, wherein the obstacle comprises a network address translation (NAT) server positioned on the network between the first peer device and the relay server.

11. The computer-readable media of claim 8, wherein at least one of the first peer device and the second peer device comprises a smart phone.

12. The computer-readable media of claim 8, wherein forwarding comprises copying the data from the request from the first peer device intended for the second peer device into a response transmitted from the relay server to the second peer device.

13. The computer-readable media of claim 8, wherein the first peer device and the second peer device are protected by separate firewalls, and wherein the relay server is positioned on the network outside of both of the separate firewalls.

14. An apparatus comprising:
   a processor controlling at least some operations of the apparatus;
   a memory storing computer executable instructions that, when executed by the processor, direct the apparatus to perform:
      receiving a request from a first peer device via a network including an obstacle, wherein the request from the first peer device comprises data intended for a second peer device;
      receiving a request from the second peer device, the request from the second peer device including an indication that the second peer device is listening for connections;
      forwarding by the relay server the data to the second peer device in response to the request received from the second peer device without the relay server buffering the data received from the first peer device intended for the second peer device; and
   generating and transmitting a response comprising peer specific signaling to the second peer device in response to the request received from the second peer device.

15. The apparatus of claim 14, wherein the obstacle comprises a firewall configured to restrict network traffic between the first peer device and other entitles on the network.

16. The apparatus of claim 14, wherein the obstacle comprises a network address translation (NAT) server positioned on the network between the first peer device and the apparatus.

17. The apparatus of claim 15, wherein the first peer device and the second peer device are protected by separate firewalls, and wherein the apparatus is configured to operate on the network outside of both of the separate firewalls.

18. The apparatus of claim 14, wherein the apparatus is part of a system that comprises the first peer device, the second peer device, and the obstacle.

19. The apparatus of claim 14, wherein forwarding comprises copying the data from the request from the first peer device intended for the second peer device into a response transmitted from the relay server to the second peer device.

* * * * *